(12) United States Patent
Bayer et al.

(10) Patent No.: US 9,254,530 B2
(45) Date of Patent: Feb. 9, 2016

(54) METHOD FOR REMOVING MATERIAL FROM A COMPONENT, AND ELECTRODE

(75) Inventors: Erwin Bayer, Dachau (DE); Martin Bussmann, Schwabenhausen (DE); Albin Platz, Ried-Baindlkirch (DE)

(73) Assignee: MTU Aero Engines GmbH, Munich (DE)

( * ) Notice: Subject to any disclaimer, the term of this patent is extended or adjusted under 35 U.S.C. 154(b) by 636 days.

(21) Appl. No.: 12/747,884

(22) PCT Filed: Dec. 5, 2008

(86) PCT No.: PCT/DE2008/002040
§ 371 (c)(1),
(2), (4) Date: Jun. 11, 2010

(87) PCT Pub. No.: WO2009/074141
PCT Pub. Date: Jun. 18, 2009

(65) Prior Publication Data
US 2010/0270168 A1   Oct. 28, 2010

(30) Foreign Application Priority Data

Dec. 13, 2007   (DE) .......................... 10 2007 060 070

(51) Int. Cl.
*B23H 3/00* (2006.01)
*B23H 7/26* (2006.01)
(Continued)

(52) U.S. Cl.
CPC .. *B23H 3/00* (2013.01); *B23H 1/04* (2013.01); *B23H 3/04* (2013.01); *B23H 3/06* (2013.01); *B23H 3/10* (2013.01); *B23H 5/10* (2013.01); *B23H 7/26* (2013.01)

(58) Field of Classification Search
CPC .............. B23H 1/10; B23H 3/10; B23H 5/14; B23H 7/36
See application file for complete search history.

(56) References Cited

U.S. PATENT DOCUMENTS 3,120,482 A * 2/1964 Williams .................. 204/224 M
3,196,093 A * 7/1965 Williams ...................... 205/665
(Continued)

FOREIGN PATENT DOCUMENTS

DE       31 26 033 A1    1/1983
GB        1050139 A      12/1966

OTHER PUBLICATIONS

Wang et al. "Principles and Application of Electrolytic Machining". National Defense Industry Press, Bejing, 2001.*
(Continued)

*Primary Examiner* — James Lin
*Assistant Examiner* — Brian W Cohen
(74) *Attorney, Agent, or Firm* — Crowell & Moring LLP

(57) ABSTRACT

A method for removing material from a component that is connected as an anode is disclosed. In an embodiment, an electrode that is connected as a cathode is guided to the component such that a gap is formed, an electrolyte is introduced into the gap, and a closed system is formed for the electrolyte by the formation of a duct. The electrolyte is continuously guided from an inlet opening to an outlet opening of the duct. Forming the duct, e.g., by guide elements that are mounted on the electrode, ensures that only those surface parts of the component to be machined from which material is to be removed enter in contact with the electrolyte while the other surface parts do not enter in contact with the electrolyte. Since the electrolyte is continuously guided across the surface, used electrolyte is continuously discharged along with residual matter while fresh electrolyte is delivered.

6 Claims, 2 Drawing Sheets

(51) Int. Cl.
  *B23H 1/04* (2006.01)
  *B23H 5/10* (2006.01)
  *B23H 3/04* (2006.01)
  *B23H 3/06* (2006.01)
  *B23H 3/10* (2006.01)

(56) References Cited

U.S. PATENT DOCUMENTS

| | | | | |
|---|---|---|---|---|
| 3,720,595 | A | | 3/1973 | Kohler |
| 4,174,268 | A | * | 11/1979 | Andrews ............... 205/665 |
| 4,256,555 | A | * | 3/1981 | Wilson et al. ............ 205/654 |
| 4,772,372 | A | | 9/1988 | Bruns et al. |
| 5,662,783 | A | * | 9/1997 | Cannon et al. ........... 204/224 M |
| 2006/0081481 | A1 | * | 4/2006 | Bayer et al. ............ 205/653 |
| 2008/0230379 | A1 | * | 9/2008 | Lee et al. ............. 204/290.01 |

OTHER PUBLICATIONS

PCT/DE2008/002040 PCT/ISA/210.
PCT/DE2008/002040 PCT/ISA/220.
PCT/DE2008/002040 PCT/ISA/237.

* cited by examiner

METHOD FOR REMOVING MATERIAL FROM A COMPONENT, AND ELECTRODE

This application claims the priority of International Application No. PCT/DE2008/002040, filed Dec. 5, 2008, and German Patent Document No. 10 2007 060 070.6, filed Dec. 13, 2007, the disclosures of which are expressly incorporated by reference herein.

BACKGROUND AND SUMMARY OF THE INVENTION

The invention relates to a method for removing material from a component. This machining is also called electro-chemical machining (ECM) or even precise electro-chemical machining (PECM).

With this method, the component from which material is supposed to be removed is connected as an anode. An electrode is guided to the component, and namely a gap is formed between the electrode and the component. Typically, the shape of the electrode is a counterpart of the shape that the component is supposed to achieve. The electrode is connected as a cathode, and an electrolyte must then be introduced between the cathode (electrode) and the anode (component), i.e., into the gap.

It is now necessary for the method to be carried out such that the removal takes place precisely at a predetermined surface area of the component and not in the surrounding areas. However, the latter can absolutely be etched by the electrolytes, particularly if the electrolyte is situated on the component on the other side of the actual effective surface, and if stray currents are flowing. Another problem is that the electrolyte gets used up during the process. As a result, the electrolyte must be replaced. If this does not occur uniformly, locally there can be depositions of the material removed from the work piece carried over in a hydroxide. At such locations, the conductivity of the electrolyte is diminished, which can lead to the electrode drifting on the component and thereby producing a short circuit.

There are numerous methods of the cited type, in which the electrolyte is guided via the electrode. In the present case, the electrolyte is not supposed to be conveyed via the electrode. Until now, there have been electrolyte systems for this with closed pressure chambers, in which the component to be machined is protected by guard electrodes outside the actual areas being machined (the so-called machining area). The disadvantage of this is that the electrolyte completely circulates around the component. The guard electrodes get used up. There is also the possibility of making an open system available, in which the electrolyte is directed via nozzles into the gap. The disadvantage of this method is that the flow in the gap is not uniform making it possible for flow grooves or dead water zones with hydroxide sludge accumulations to occur.

The object of the invention is making available a method for removing material from a component that eliminates the problems of the prior art.

Thus, a duct is formed, which has an inlet opening and an outlet opening, wherein the component forms a wall with a part of its surface and the electrode also forms a wall of the duct with at least one part of its surface. During removal, the electrolyte is continuously guided from the inlet opening to the outlet opening.

A closed system is produced by forming a duct. The electrolyte thereby reaches only the area from which material is supposed to be removed (which is being machined), and no etching occurs in the unprotected neighboring areas. Because electrolyte is continuously directed or guided through the duct, there is a reliable replacement of the used electrolyte, i.e., there is always enough fresh electrolyte in front of the electrode. As a result, one maintains a high feed rate during machining, because the process can proceed in a trouble-free manner. The electrolyte flow is particularly uniform and with a suitable formation of the duct it is also not turbulent so that there are no dead water zones and the hydroxide can be flushed out easily.

The uniformity of the electrolyte flow can be guaranteed especially reliably by the electrolyte being introduced into the inlet opening of the duct at a pressure of 2 to 50 bar, wherein a suitable nozzle is preferably used for this.

The formation of the duct can be accomplished in an especially simple manner by providing two (in particular non-conductive) guide elements that bridge the gap. The guide elements can be mounted on the component or even attached manually, however, it has proven to be especially readily convenient to accomplish if the guide elements are arranged or mounted on the electrode (i.e., are a part of the electrode unit). Then, when moving the electrode toward the component, the guide elements make contact with the surface of the component, while forming the gap, so that immediately with the formation of the gap, the duct is also formed in its final size.

There are also cases in which a duct is made available more or less automatically by the shape of the component on the electrode. This is particularly the case if the component supplied is a component that has a recess, and if an electrode configured as a formed electrode tool is used, which engages precisely in the component. Then just by forming the gap, the duct is formed.

In the case of this type of arrangement, the depth of the recess is supposed to be increased by the removal process, and not necessarily in terms of its lateral dimensions. As a result, it is expedient to partially coat the electrode with an insulating body such that an electrical connection of the electrode with the component is made possible via the electrolyte only in one section of the duct.

A preferred case in which the method can be used is producing engine components made of nickel-based or titanium-based alloys. In this case, the engine component is the component arising from the original component through machining. Such a typical engine component is a blade profile.

Preferred embodiments of the invention are described in the following making reference to the drawings.

DETAILED DESCRIPTION OF THE DRAWINGS

Figure 1:
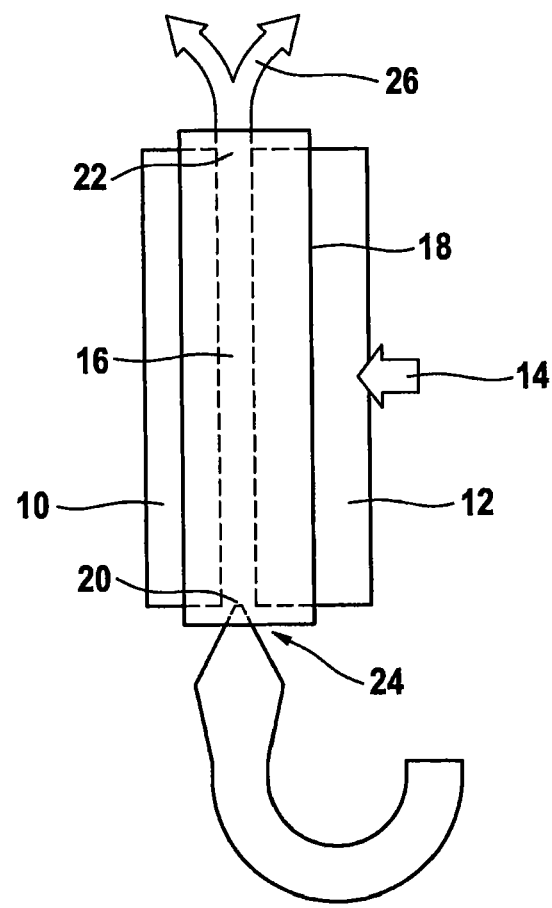
FIG. 1 is a schematic view of a first embodiment of the method according to the invention.

Material is supposed to be removed from a component designated as 10 using electro-chemical machining (so-called machining). To this end, the component 10 is connected as an anode. Now an electrode 12 is connected as a cathode, and it is moved according to the arrow 14 in the direction towards the component 10, however, such that the surfaces of the component 10 and the electrode 12 do not make contact in order to avoid producing a short circuit. In fact, a gap 16 is made available between the component 10 and the electrode 12, as FIG. 1 shows. This gap 16 is now delimited on two sides by a guide element 18. This is preferably accomplished so that the guide element 18 is mounted on the electrode 12, and the guide element is namely non-conductive and elastic. When moving the electrode 12 according to the arrow 14, the two guide elements 18 reach the surface of the component 10 such that a duct is formed. Thus, a lower wall of the duct is formed by the component 10, an upper wall of the duct is formed by the electrode 12, and the side walls of the duct are formed by the guide elements 18. The duct has an inlet opening 20 shown at the bottom of FIG. 1 and an outlet opening 22 shown at the top of FIG. 1. Electrolyte is now introduced into the duct. The electrolyte is pressed into the duct via the inlet opening 20 by a nozzle 24 at a high pressure of at least 2 and up to 50 bar in the duct. The outlet opening 22 is configured, in particular through suitable formation of the electrode 12, such that the electrolyte exits from the duct in a free stream 26 and is directed away from the component 10. The invention guarantees that, because of the presence of the guide elements 18, the electrolyte circulates around only the part of the surface of the component 10 which is supposed to be machined. The electrolyte is guided continuously through the duct, thus fresh electrolyte is continuously available, and residual matter is flushed out.

In a modification of the method, a component 10' is used that has recesses 28. The depth of the recess 28 is supposed to be increased (i.e., upwardly in FIG. 2) by the machining method. Electrodes 12' are configured to match the recesses 28. The electrodes engage in the recesses, and namely such that they do not make contact with the component 10' either laterally or at the end of the recess 28. As a result, a U-shaped duct 30 is made available. Nozzles 24 now spray an electrolyte into the duct (inlet opening 20') at a pressure of 2 to 50 bar, and the electrolyte exits the duct 30 respectively via an outlet opening 22'. So that the electrodes only act in the direction of the depth of the recess 28, they are respectively coated laterally with an insulating body 32.

Figure 2:
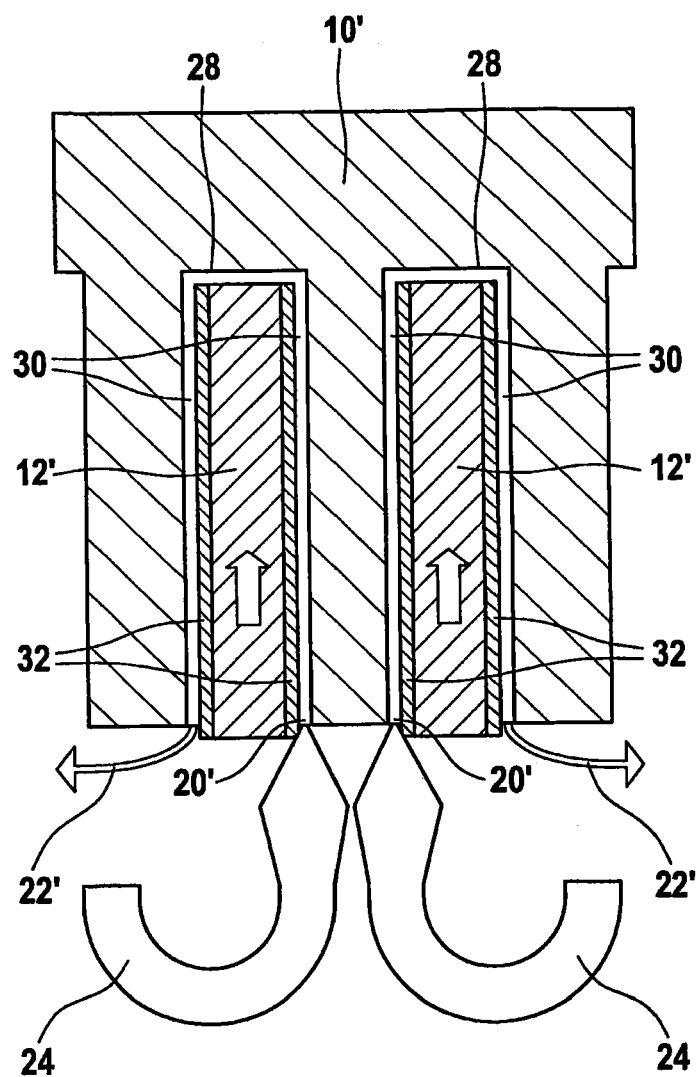
FIG. 2 is a schematic view of a second embodiment of the method according to the invention.

With the embodiment according to FIG. 2, a separate measure does not have to be taken to form the duct 30, except that the electrodes 12' must be configured to match the recesses 28 of the component 10'. In this case as well, the electrolyte flows uniformly through the duct 30 such that fresh electrolyte is continuously available and the machining process can be carried out relatively quickly, because it is trouble-free.

The invention claimed is:

1. A method for removing material from a component, comprising the steps of:
    connecting the component as an anode;
    connecting a single electrode as a cathode;
    guiding the single electrode to the component such that a gap is defined between the electrode and the component;
    forming a duct defined by at least a part of a surface of the component and a part of a surface of the electrode and including an inlet opening and an outlet opening defined by at least the component and the single electrode, wherein the inlet opening is disposed at a first distal end of the duct and the outlet opening is disposed at a second distal end of the duct, wherein the duct is further defined by two guide elements that each extend along an entire longitudinal length of the duct, wherein the guide elements are mounted on the single electrode such that when the gap is defined the duct is also simultaneously defined, where the formed duct has a box shape with a lower wall which is the part of the surface of the component, an upper wall which is the part of the surface of the single electrode, and side walls orthogonal to the lower wall and the upper wall which are the two guide elements, wherein the two guide elements, as the side walls, contact the single electrode and the component such that an electrolyte is circulatable through the formed duct around the component only at the part of the surface of the component that is the lower wall of the duct; and
    continuously guiding the electrolyte through the duct from the inlet opening to the outlet opening during a removal of the material from the component.

2. The method according to claim 1, wherein the electrolyte is introduced into the inlet opening at a pressure of 2 to 50 bar.

3. The method according to claim 1, wherein the electrolyte is introduced into the inlet opening via a nozzle.

4. The method according to claim 1, wherein the component is an engine component made of nickel-based or titanium-based alloys.

5. The method according to claim 4, wherein the component is a blade.

6. The method according to claim 1, wherein the two guide elements are non-conductive.

\* \* \* \* \*